(12) United States Patent
Wang

(10) Patent No.: US 12,492,868 B2
(45) Date of Patent: Dec. 9, 2025

(54) STORING COLD ENERGY AND FREEZE DESALINATION OF SALT WATER

(71) Applicant: Hailei Wang, Logan, UT (US)

(72) Inventor: Hailei Wang, Logan, UT (US)

(73) Assignee: Utah State University, Logan, UT (US)

( * ) Notice: Subject to any disclaimer, the term of this patent is extended or adjusted under 35 U.S.C. 154(b) by 427 days.

(21) Appl. No.: 18/188,996

(22) Filed: Mar. 23, 2023

(65) Prior Publication Data

US 2023/0304746 A1  Sep. 28, 2023

Related U.S. Application Data

(60) Provisional application No. 63/322,932, filed on Mar. 23, 2022.

(51) Int. Cl.
| | |
|---|---|
| *F28D 20/02* | (2006.01) |
| *C02F 1/22* | (2023.01) |
| *F01P 3/12* | (2006.01) |
| *C02F 103/08* | (2006.01) |

(52) U.S. Cl.
CPC ............ *F28D 20/02* (2013.01); *C02F 1/22* (2013.01); *F01P 3/12* (2013.01); *C02F 2103/08* (2013.01); *C02F 2301/022* (2013.01); *C02F 2301/024* (2013.01); *C02F 2303/10* (2013.01)

(58) Field of Classification Search
CPC ............... F28D 20/02; F28D 20/0034; F28D 2020/0078; C02F 1/22; C02F 2103/08; C02F 2301/022; C02F 2301/024; C02F 2303/10; C02F 2201/009; F01P 3/12; Y02A 20/124

See application file for complete search history.

(56) References Cited

FOREIGN PATENT DOCUMENTS

CN          103459324 A   *  12/2013    ............... F25C 1/16

* cited by examiner

*Primary Examiner* — Waqaas Ali
(74) *Attorney, Agent, or Firm* — Kunzler Bean & Adamson

(57) ABSTRACT

For storing supercooled water, a method cools a water flow with a specified mass flow rate to a specified temperature to form a supercooled water flow. The method conducts the supercooled water flow through a flow pipe with a specified pipe impedance to an ice tank. The method stores the supercooled water flow as ice in the ice tank.

12 Claims, 8 Drawing Sheets

STORING COLD ENERGY AND FREEZE DESALINATION OF SALT WATER

CROSS-REFERENCE TO RELATED APPLICATIONS

This application claims priority to U.S. Provisional Patent Application No. 63/322,932 entitled "MODELING, SIMULATION AND OPTIMIZATION OF NUCLEAR HYBRID ENERGY SYSTEMS" and filed on Mar. 23, 2022 for Stephen Michael Hills, which is incorporated herein by reference.

BACKGROUND INFORMATION

The subject matter disclosed herein relates to supercooling water.

BRIEF DESCRIPTION

A method for storing supercooling water is disclosed. The method cools a water flow with a specified mass flow rate to a specified temperature to form a supercooled water flow. The method conducts the supercooled water flow through a flow pipe with a specified pipe impedance to an ice tank. The method stores the supercooled water flow as ice in the ice tank. An apparatus and system are also disclosed that perform the method.

BRIEF DESCRIPTION OF DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
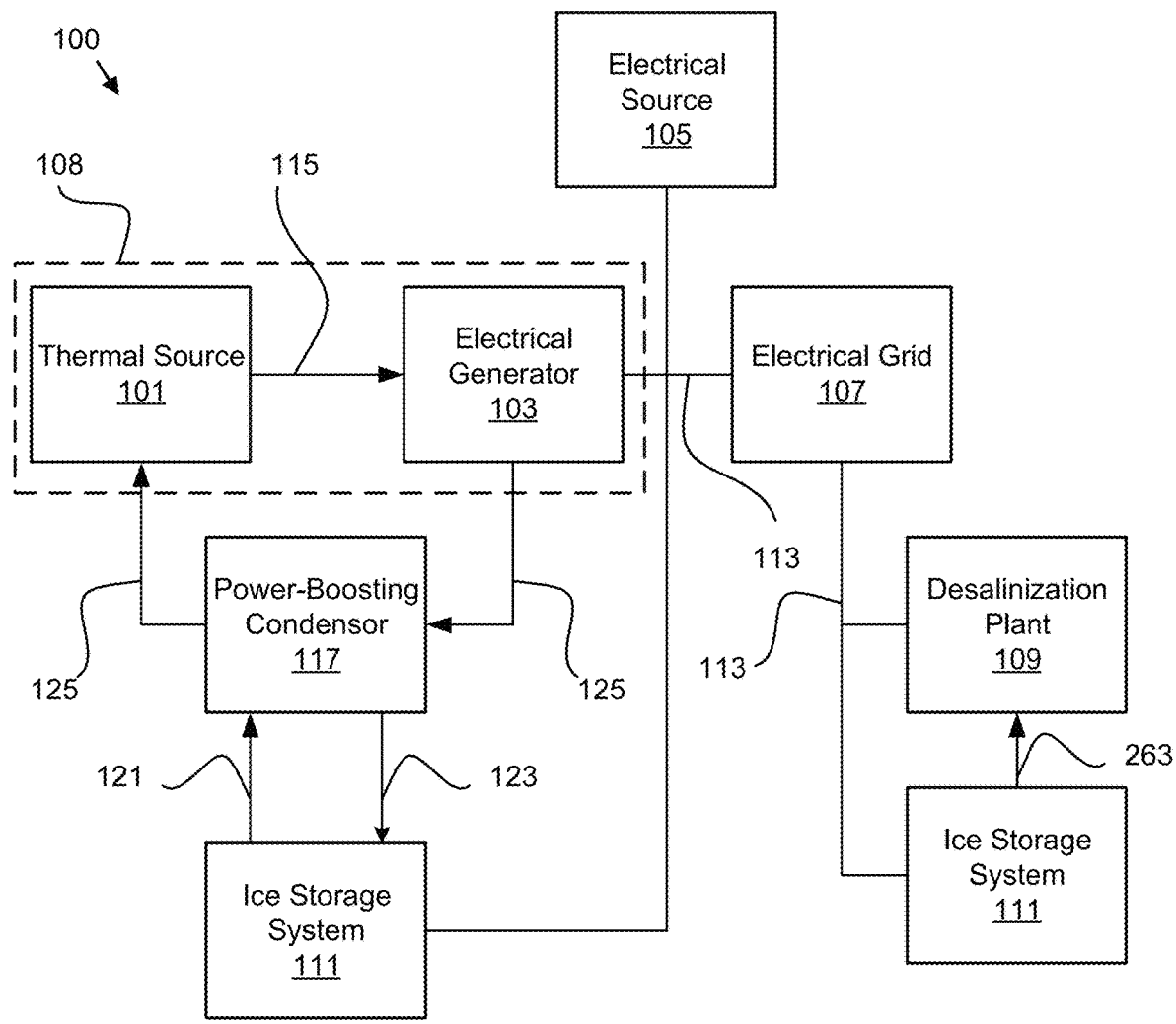
FIG. 1 is a schematic block diagram of one embodiment of a power system.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a circuit, module or system. Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Hills, Stephen "Modeling, Simulation and Optimization of Nuclear Hybrid Energy Systems Using OpenModelica and RAVEN", Hills, Stephen et al. "Modeling and Optimization of Integrated Energy-Water Systems", Wang, Hailei "Green energy buildings with integrated space heating, cooling, hot water heating and thermal storage", Wang Hailei, "Novel Ice Thermal Energy Storage System for Grid-Interactive Buildings", Zhang, Yili, "Dynamic Modeling and Simulation of Building Cooling System with Supercooling-based Ice Energy Storage", Wang, Hailei "Integrated Freeze Desalination and Ice Energy Storage Technology Using Supercooling", "Concept Paper for DE-FOA-0002196 Subtopic 1.5", "Concept Paper for DE-FOA-0002196 Subtopic 1.2", Wang, Hailei "Integrated Freeze Desalination and Ice Energy Storage Technology Using Supercooling", Hills, Stephen "Modeling, Simulation and Optimization of Nuclear Hybrid Energy Systems Using OpenModelica and RAVEN", and Hills, Stephen "Dynamic Simulation and Optimization of Integrated Clean Energy-Water System" and attached documents are incorporated herein by reference.

The description of elements in each figure may refer to elements of proceeding figures. Like numbers refer to like elements in all figures, including alternate embodiments of like elements.

FIG. 1 is a schematic block diagram of one embodiment of a power system 100. The power system 100 may supply electrical energy 113 to electrical grid 107. A power plant 108 may supply the electrical energy 113. In addition, other electrical sources 105 such as solar power, wind power, geothermal power, and the like may supply the electrical energy 113. The electrical grid 107 may supply the electrical energy 113 for various uses.

The potential supply of the electrical energy 113 may vary greatly depending on available sunlight, available wind, and the like. In addition, the demand for the electrical energy 113 may also vary depending upon the time of day and the weather. For example, electrical energy 113 may be abundant on a sunny, windy day while demand may be low because of low temperatures. Prices for the electrical energy 113 may be adjusted to balance supply and demand. Unfortunately, when prices for the electrical energy 113 are low, it is difficult to store the electrical energy 113 for use when prices are high.

The embodiments store electrical energy 113 as cold energy in the form of ice in an ice storage system 111 while using the electrical energy 113 to freeze-desalinate salt water in a desalination plant 109. The cold energy may be stored and fresh water produced when the price electrical energy 113 is low. The stored cold energy in ice may be employed to increase the efficiency of the power plant 108 and for cooling at a later time when the cost of the electrical energy 113 is higher. As a result, the ice storage system 111 functions as a cold storage battery that increases the efficiency of electrical energy utilization.

In the depicted embodiment, the power plant 108 includes a thermal source 101 such as burning coal or natural gas or nuclear energy. The thermal source 101 supply high-energy steam 115 to drive an electrical generator 103. Low energy water/water vapor 125 is then cooled to be reheated by the thermal source 101.

In the depicted embodiment, chilled water 121 from the ice storage system 111 is provided to a power-boosting condenser 117 to further cool the water/water vapor 125, increasing the efficiency of the power plant 108. The ice providing the chilled water 121 is efficiently created from the electrical energy 113 by the ice storage system 113 as will be described hereafter. In addition, the ice may be created when the price of electrical energy 113 is low and used to increase the efficiency of the generation of the electrical energy 113 when the price of the electrical energy 113 is high. The power-boosting condenser 117 may conduct return water 123 to the ice storage system 113.

In one embodiment, the ice storage system 111 is used to provide desalinated water 263 to a desalination plant 109 as will be described hereafter. The desalinated water 263 may increase the efficiency of the desalinization plant 109.

Figure 2:
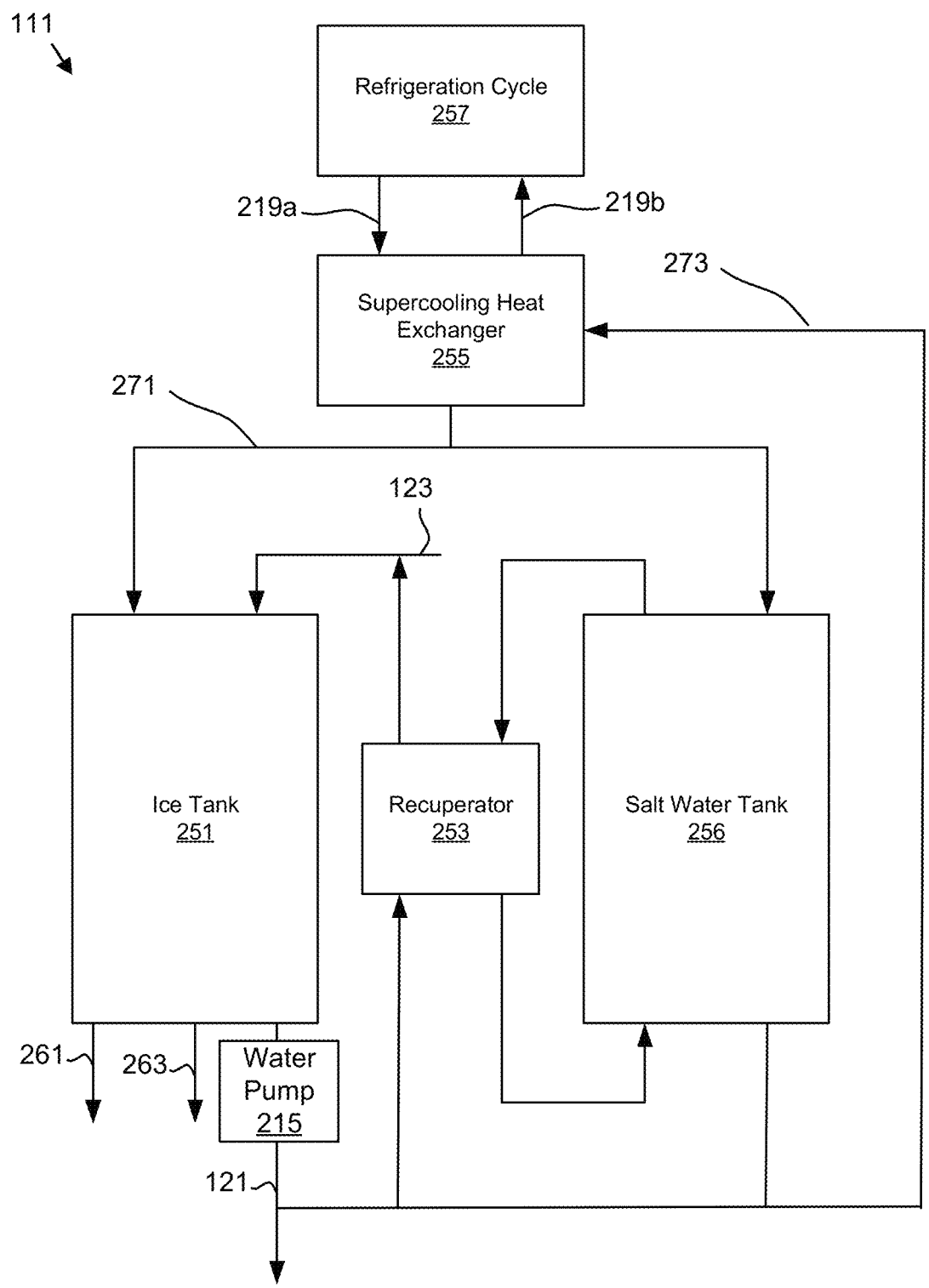
FIG. 2 is a schematic block diagram of one embodiment of a cooling system with ice storage system, which also achieves heat exchange between produced ice/brine and salt water.

FIG. 2 is a schematic block diagram of one embodiment of the heat exchange within the water streams (incoming salt water and the produced ice/brine solution). The left ice tank contains ice/brine while the right ice tank contains salt water. Both streams can exchange heat (thermal energy) through the recuperator to improve the freeze desalination energy efficiency. In the depicted embodiment, a waterflow 273 with the specified mass flow rate is provided to a supercooling heat exchanger 255. The specified mass flow rate may be dependent on the size of the ice storage and/or freeze desalination plant to maintain the supercooled waterflow 271 as either laminar or turbulent flow. The supercooling heat exchanger 255 may employ coolant 219 from a refrigeration cycle 257 to cool the waterflow 273 to a specified temperature to form a supercooled waterflow 271. The specified temperature may be in the range of −1 to −5 degrees Celsius.

The supercooled waterflow 271 is conducted through a flow pipe to an ice tank 251 without forming ice in the supercooling heat exchanger 255 and/or the flow pipe. The supercooled waterflow 271 is stored as ice, chilled water 121, or combinations thereof in the ice tank 251. Because the ice forms in the ice tank 251 instead of on cooling surfaces of the supercooling heat exchanger 255, the efficiency of forming ice and storing cold energy is improved.

At a later time, chilled water 121 may be pumped from the ice tank 251 by a water pump 215. In one embodiment, a recuperator 253 is used to transfer heat between the chilled water 121 and salt water in a salt water tank 256. After cooling the salt water, the chilled water 121 is raised to higher temperature and returned to the ice/brine tank 251. In doing so, the energy needed for freeze-desalinate the salt water is reduced, thus improving the overall system efficiency.

In one embodiment, brine 261 from the ice tank 251 may be drained as part of a desalinization process as will be described hereafter. In addition, desalinated water 263 from melting ice may be conducted from the ice tank 251 to the desalinization plant 109 for its further uses.

Figure 3A:
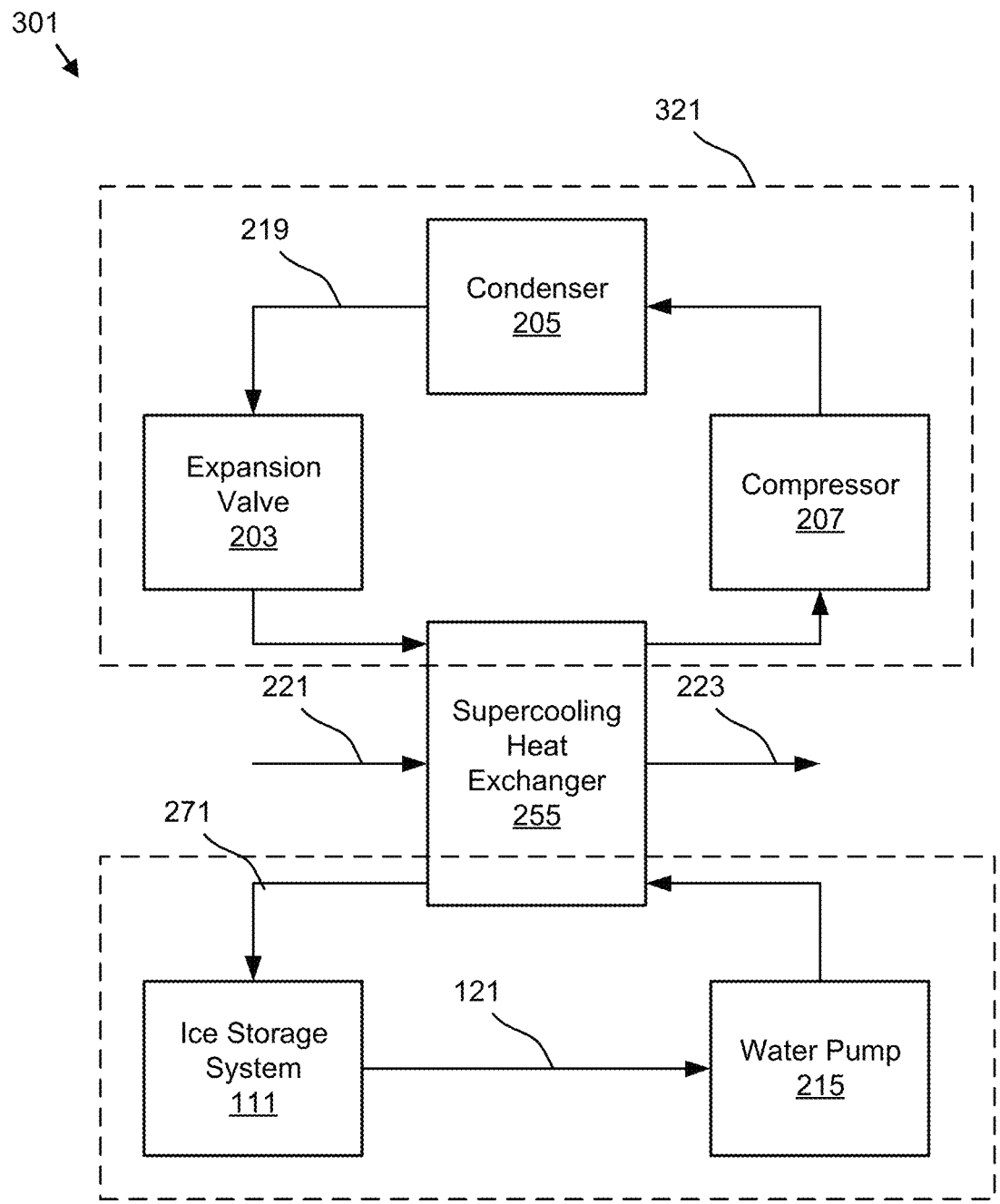
FIG. 3A is a schematic block diagram of one embodiment of a climate system with an ice storage system.

FIG. 3A is a schematic block diagram of one embodiment of a climate system 301 with the ice storage system 111. In the depicted embodiment, a refrigeration device 321 includes a condenser 205, an expansion valve 203, and a compressor 207. The compressor 207 compresses a coolant 219 that releases heat in the condenser 205 and cools after being expanded at the expansion valve 203. The chilled coolant 219 is provided to a supercooling heat exchanger 255.

In one embodiment, the supercooling heat exchanger 255 provides supercooled waterflow 271 to the ice storage system 111. Chilled water 121 from the ice storage system 111 may later be pumped by the water pump 215 to the supercooling heat exchanger 255 to cool input air 221 and provide cool air 223. The cool air 223 may be used to cool the building.

Figure 3B:
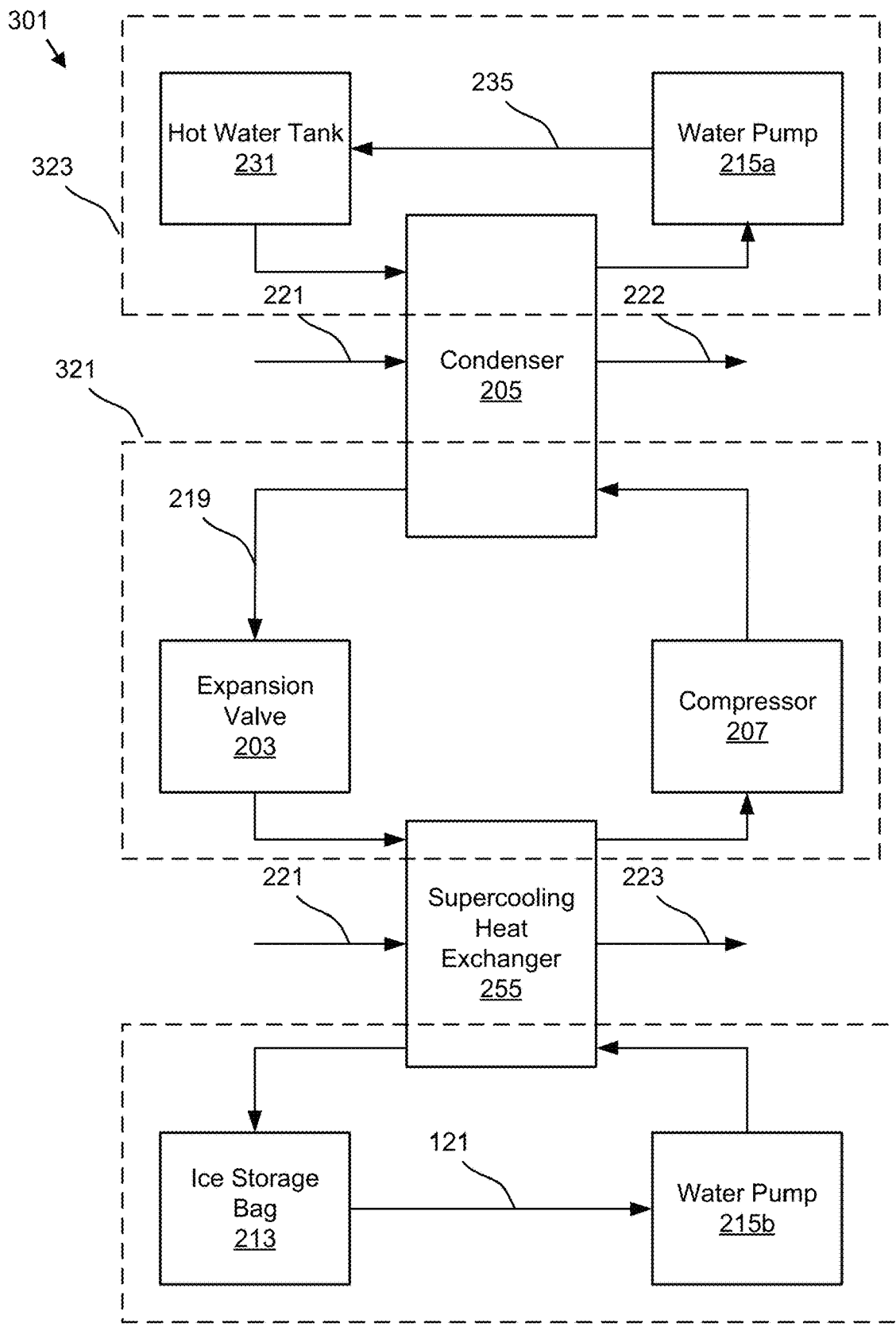
FIG. 3B is a schematic block diagram of one alternate embodiment of a climate system with an ice storage system.

FIG. 3B is a schematic block diagram of one alternate embodiment of a climate system 301 with an ice storage system 111. In the depicted embodiment, a heat storage system 323 is coupled to the condenser 205 of FIG. 3A. Heated water 235 that is heated by the condenser 205 may be pumped to a hot water tank 231 and stored for later use as hot water or being used to heat air 221 to produce heated air 222 for space heating applications.

Figure 4A:
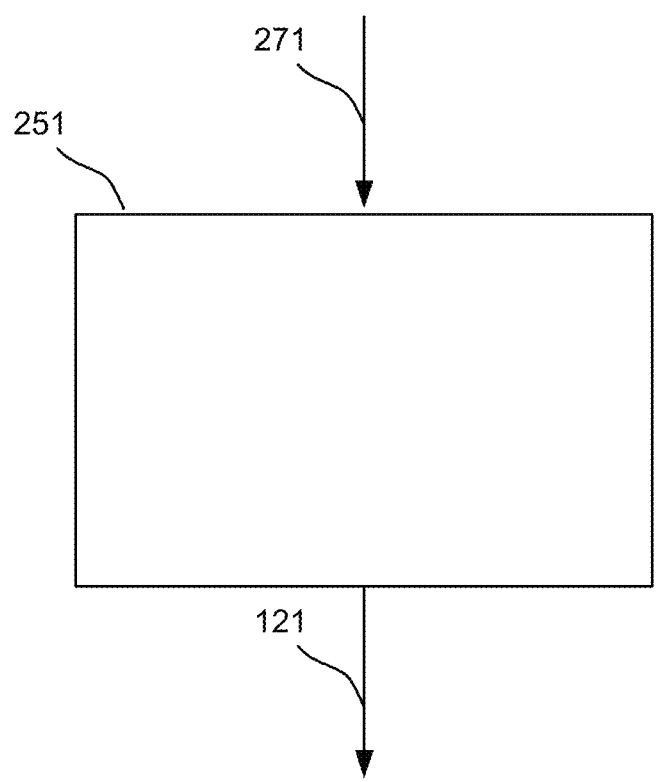
FIG. 4A is a drawing illustrating one embodiment of an ice tank.

FIG. 4A is a drawing illustrating one embodiment of the ice tank 251. The ice tank 251 may receive the supercooled waterflow 271 which forms ice upon contact with ice in the ice tank 251 and/or surfaces of the ice tank 251. Because there are no cooling surfaces within the ice tank 251, the ice tank 251 may be of any shape and/or suitable material. For example, the ice tank 251 may be a large bag formed of industrial plastics. The ice tank 251 may be insulated.

Figure 4B:
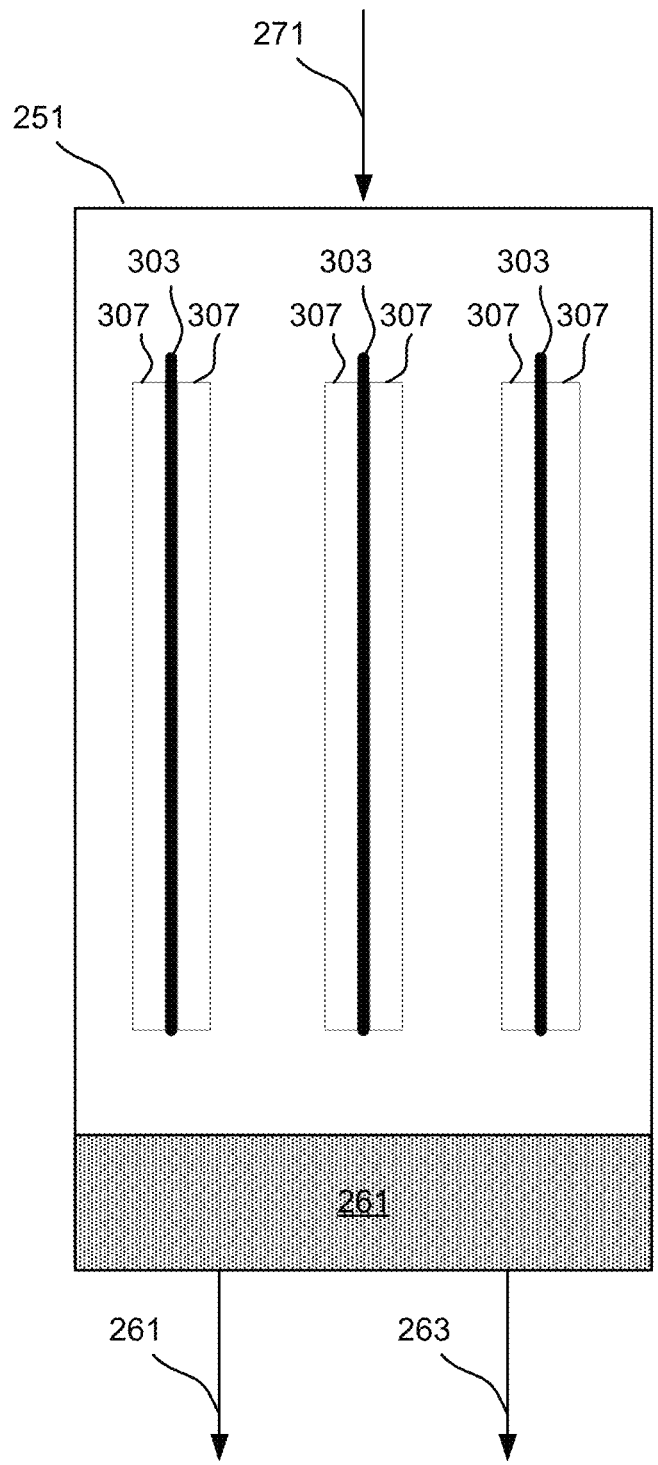
FIG. 4B is a drawing illustrating one embodiment of a freeze salinization tank.

FIG. 4B is a drawing illustrating one embodiment of a freeze desalinization ice tank 251. In the depicted embodiment, a supercooled waterflow 271 of saltwater is applied to ice plates 303. The ice plates 303 may be vertically disposed. Ice 307 forms on the ice plates 303 while a brine 261 flows to and collects at the bottom of the ice tank 251. The brine 261 may be drained from the ice tank 251. The ice 307 may be washed and allowed to melt to form desalinated water 263 that is pumped from the ice tank 251.

Figure 4C:
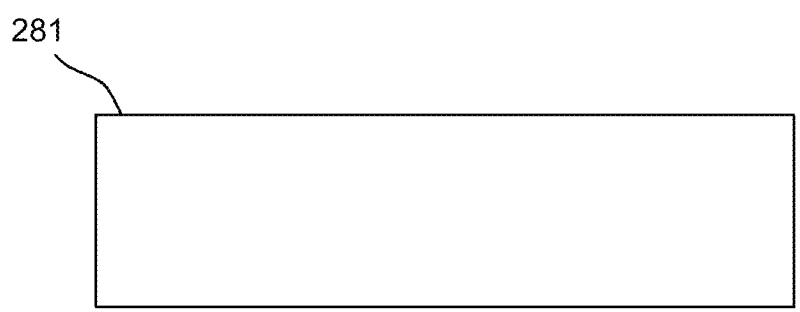
FIG. 4C is a side view drawing illustrating one embodiment of a flow pipe.

FIG. 4C is a side view drawing illustrating one embodiment of a flow pipe 281. The flow pipe 281 conducts the supercooled waterflow 271 to the ice tank 251. The flow pipe 281 has a specified pipe impedance and/or control element that prevent the formation of ice within the flow pipe 281.

Figure 5:
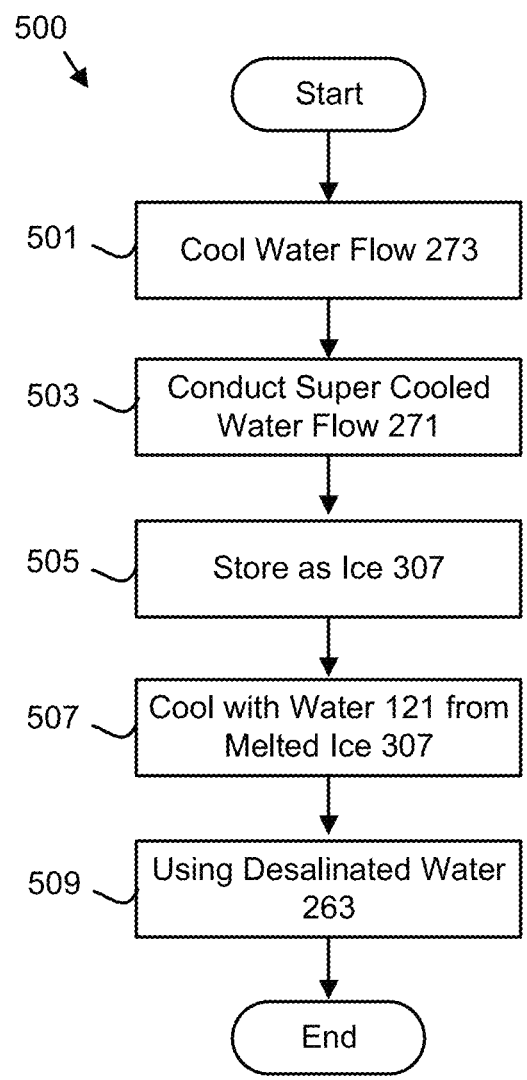
FIG. 5 is a flow chart diagram illustrating one embodiment of a super cooling method.

FIG. 5 is a flow chart diagram illustrating one embodiment of a super cooling method 500. The method 500 may store cold energy as ice. The method 500 may be performed by the ice storage system 111.

The supercooling heat exchanger 255 may cool 501 the waterflow 273 to form a supercooled waterflow 271. The flow pipe 281 may conduct 503 the supercooled waterflow 271 to the ice tank 251. The ice tank 251 stores 505 the supercooled waterflow 271 as ice 307. Chilled water 121 from the melting ice 307 is used to cool 507 processes that benefit from cold energy such as cooling the power boosting condenser 117 and/or cooling the supercooling heat exchanger 255. In addition, desalinated water 263 may be used 509 by a desalination plant 109.

Electrical energy 113 is often available a low price. However, this low price electrical energy 113 is difficult to store. The embodiments efficiently store cold energy as ice 307 by supercooling water and then storing the supercooled waterflow 271 as ice 307 in an ice storage tank 251. Because the ice 307 forms separate from cooling surfaces, the efficiency of the cold storage is improved.

This description uses examples to disclose the invention and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A method comprising:
   a salt water tank containing salt water;
   an ice tank comprising ice plates disposed vertically in the ice tank;
   cooling a waterflow of the salt water from the salt water tank with a specified mass flow rate to a specified temperature to form a supercooled waterflow, wherein the specified mass flow rate maintains the supercooled waterflow as laminar flow, and the specified temperature is in the range of −1 to −5 degrees Celsius;
   conducting the supercooled waterflow through a flow pipe with a specified pipe impedance to an ice tank; and
   storing the supercooled waterflow as ice in the ice tank if salt water is used as the water source, the method provides freeze desalination;
   a recuperator transferring heat from the salt water of the salt water tank to chilled water of the ice tank; and
   a power-boosting condenser that cools water and/or water vapor from an electrical generator from ice and/or chilled water from the ice tank.

2. The method of claim 1, the method further comprising cooling a power-boosting condenser of a power plant with chilled water from melted ice in the ice tank.

3. The method of claim 1, the method further comprising cooling a supercooling heat exchanger with chilled water from melted ice in the ice tank.

4. The method of claim 1, the method further comprising:
   applying the supercooled waterflow to ice plates in the ice tank, wherein the ice forms on the ice plates;
   collecting brine in the ice tank;
   draining the brine from the ice tank;
   washing the ice; and
   draining desalinated water from the melted ice in the ice tank.

5. The method of claim 4, wherein the ice plates are vertically disposed.

6. An apparatus comprising:
   a salt water tank containing salt water;
   an ice tank comprising ice plates disposed vertically in the ice tank;
   a supercooling heat exchanger that cools a waterflow of the salt water from the salt water tank with a specified mass flow rate to a specified temperature to form a supercooled waterflow, wherein the specified mass flow rate maintains the supercooled waterflow as laminar flow and the specified temperature is in the range of −1 to −5 degrees Celsius;
   a flow pipe with a specified pipe impedance that conducts the supercooled waterflow to the ice plates of the ice tank;
   a recuperator transferring heat from the salt water of the salt water tank to chilled water of the ice tank; and
   a power-boosting condenser that cools water and/or water vapor from an electrical generator from ice and/or chilled water from the ice tank.

7. The apparatus of claim 6, wherein the ice tank comprises ice plates that receive the supercooled waterflow for freeze desalination.

8. The apparatus of claim 7, wherein the ice plates are vertically disposed to facilitate brine drainage for freeze desalination.

9. The apparatus of claim 6, wherein the supercooling heat exchanger is cooled by chilled water from the ice tank to cool input air.

10. A system comprising:
    an electrical generator;
    a salt water tank containing salt water;
    an ice tank comprising ice plates disposed vertically in the ice tank;
    a supercooling heat exchanger that cools a waterflow of the salt water from the salt water tank with a specified mass flow rate to a specified temperature to form a supercooled waterflow, wherein the specified mass flow rate maintains the supercooled waterflow as laminar flow and the specified temperature is in the range of −1 to −5 degrees Celsius;
    a flow pipe with a specified pipe impedance that conducts the supercooled waterflow to the ice plates of the ice tank;
    a recuperator transferring heat from the salt water of the salt water tank to chilled water of the ice tank; and
    a power-boosting condenser that cools water and/or water vapor from the electrical generator from ice and/or chilled water from the ice tank.

11. The system of claim 10, wherein the ice tank comprises ice plates that receive the supercooled waterflow for freeze desalination.

12. The system of claim 10, wherein the supercooling heat exchanger is cooled by chilled water from the ice tank to cool input air.

* * * * *